United States Patent
Bourke et al.

(10) Patent No.: US 7,291,272 B2
(45) Date of Patent: Nov. 6, 2007

(54) INORGANIC CONTAMINANT REMOVAL FROM WATER

(75) Inventors: Michael Francis Bourke, Denver, CO (US); Hung Van Nguyen, Glen Iris (AU)

(73) Assignee: Orica Australia Pty Ltd., Melbourne (AU)

( * ) Notice: Subject to any disclaimer, the term of this patent is extended or adjusted under 35 U.S.C. 154(b) by 384 days.

(21) Appl. No.: 11/124,624

(22) Filed: May 6, 2005

(65) Prior Publication Data

US 2006/0011550 A1    Jan. 19, 2006

Related U.S. Application Data

(60) Provisional application No. 60/568,972, filed on May 7, 2004.

(51) Int. Cl.
 *B01D 15/04*   (2006.01)
(52) U.S. Cl. .................. 210/670; 210/672; 210/677; 210/684; 210/688; 210/690
(58) Field of Classification Search ............. 210/670, 210/672, 677, 684, 688, 690
 See application file for complete search history.

(56) References Cited

U.S. PATENT DOCUMENTS

| | | | |
|---|---|---|---|
| 2,368,574 A * | 1/1945 | Shoemaker ............... 210/672 |
| 2,642,514 A | 6/1953 | Herkenhoff | |
| 2,697,724 A | 12/1954 | Collier | |
| 3,560,378 A | 2/1971 | Weiss et al. | |
| 3,808,305 A | 4/1974 | Gregor | |
| 3,996,131 A | 12/1976 | Conn | |
| 4,028,237 A | 6/1977 | Nishimura et al. | |
| 4,049,546 A | 9/1977 | Rock | |
| 4,123,396 A | 10/1978 | Remnaum et al. | |
| 4,154,675 A | 5/1979 | Jowett et al. | |
| 4,207,397 A | 6/1980 | Davis et al. | |
| 4,269,760 A | 5/1981 | Wakimoto et al. | |
| 4,279,756 A | 7/1981 | Weiss et al. | |
| 4,289,617 A | 9/1981 | Davis | |

(Continued)

FOREIGN PATENT DOCUMENTS

AU   5270979   6/1980

(Continued)

OTHER PUBLICATIONS

Derwent Abstract Accession No. 91-255202/35, HU To56-044-A, Villamosenergiaipari Ki, Jul. 29, 1991.

(Continued)

*Primary Examiner*—Chester T Barry
(74) *Attorney, Agent, or Firm*—Greenlee Winner and Sullivan, PC

(57) ABSTRACT

A method is provided for removing an inorganic ionic species or organometallic ion contaminant, or combination contaminants, including such as arsenic, chromium, bromide, bromate, perchlorate, and/or others from water which contains an unacceptably high concentration of the contaminant(s). The method includes treating the water with an ion exchange resin, preferably a magnetic ion exchange resin such as MIEX® Resin, which is capable of adsorbing the inorganic ionic species contaminant(s), and regenerating and recycling the ion exchange resin back to the process. The method produces potable water from ground water containing such contaminants and eliminates breakthrough and chromatographic peaking problems observed with conventional ion exchange systems.

43 Claims, 7 Drawing Sheets

U.S. PATENT DOCUMENTS

| | | |
|---|---|---|
| 4,303,531 A | 12/1981 | Kawabata et al. |
| 4,312,956 A | 1/1982 | Chong et al. |
| 4,314,905 A | 2/1982 | Etzel et al. |
| 4,329,225 A | 5/1982 | Davis et al. |
| 4,447,475 A | 5/1984 | Lubbock et al. |
| 4,473,474 A | 9/1984 | Ostreicher et al. |
| 4,537,683 A | 8/1985 | Isacoff et al. |
| 4,632,745 A | 12/1986 | Guiffrida et al. |
| 4,648,976 A | 3/1987 | Chen |
| 4,670,154 A | 6/1987 | Carlson et al. |
| 4,673,504 A | 6/1987 | Ostreicher et al. |
| 4,693,832 A | 9/1987 | Hurst |
| 4,702,840 A | 10/1987 | Degen et al. |
| 4,724,082 A | 2/1988 | Boom |
| 4,734,200 A | 3/1988 | Berry |
| 4,737,921 A | 4/1988 | Goldwasser et al. |
| 4,804,465 A | 2/1989 | Brown |
| 4,806,244 A | 2/1989 | Guilhem |
| 4,808,316 A | 2/1989 | Otomura et al. |
| 4,828,715 A | 5/1989 | Sander |
| 4,839,057 A | 6/1989 | White |
| 4,935,450 A | 6/1990 | Cone, Jr. |
| 4,952,386 A | 8/1990 | Davison et al. |
| 4,956,061 A | 9/1990 | Dempsey et al. |
| 5,043,072 A | 8/1991 | Hitotsuyanagi et al. |
| 5,120,688 A | 6/1992 | Hsieh |
| 5,128,041 A | 7/1992 | Degen et al. |
| 5,143,583 A | 9/1992 | Marchessault et al. |
| 5,149,437 A | 9/1992 | Wilkinson et al. |
| 5,152,896 A | 10/1992 | Mazet et al. |
| 5,182,023 A | 1/1993 | O'Connor et al. |
| 5,215,632 A | 6/1993 | Fritts et al. |
| 5,236,595 A | 8/1993 | Wang et al. |
| 5,248,424 A | 9/1993 | Cote et al. |
| 5,254,257 A | 10/1993 | Brigano et al. |
| 5,320,756 A | 6/1994 | Winston |
| 5,364,534 A | 11/1994 | Anselme et al. |
| 5,403,495 A | 4/1995 | Kust et al. |
| 5,449,522 A | 9/1995 | Hill |
| 5,464,530 A | 11/1995 | Stivers |
| 5,494,582 A | 2/1996 | Goodman |
| 5,547,585 A | 8/1996 | Shepherd et al. |
| 5,595,666 A | 1/1997 | Kochen et al. |
| 5,639,377 A | 6/1997 | Banham et al. |
| 5,707,514 A | 1/1998 | Yamasaki et al. |
| 5,728,302 A | 3/1998 | Connor et al. |
| 5,772,891 A | 6/1998 | Yamasaki et al. |
| 5,855,790 A | 1/1999 | Bradbury et al. |
| 5,876,685 A | 3/1999 | Krulik et al. |
| 5,900,146 A | 5/1999 | Ballard et al. |
| 5,932,099 A | 8/1999 | Cote et al. |
| 6,020,210 A | 2/2000 | Miltenyi |
| 6,027,649 A | 2/2000 | Benedek et al. |
| 6,045,694 A | 4/2000 | Wang et al. |
| 6,110,375 A | 8/2000 | Bacchus et al. |
| 6,120,688 A | 9/2000 | Daly et al. |
| 6,143,717 A | 11/2000 | Hill |
| 6,171,487 B1 | 1/2001 | Rousseau et al. |
| 6,171,489 B1 | 1/2001 | Ballard et al. |
| 6,197,193 B1 | 3/2001 | Archer |
| 6,200,471 B1 | 3/2001 | Nohren |
| 6,203,705 B1 | 3/2001 | James et al. |
| 6,267,892 B1 | 7/2001 | Wada et al. |
| 6,338,803 B1 | 1/2002 | Campbell et al. |
| 6,355,221 B1 | 3/2002 | Rappas |
| 6,372,143 B1 | 4/2002 | Bradley |
| 6,375,848 B1 | 4/2002 | Cote et al. |
| 6,416,668 B1 | 7/2002 | Al-Samadi |
| 6,436,297 B1 | 8/2002 | Lebeau et al. |
| 6,461,514 B1 | 10/2002 | Al-Samadi |
| 6,464,881 B2 | 10/2002 | Thoraval |
| 6,491,827 B1 | 12/2002 | Temple et al. |
| 6,517,723 B1 | 2/2003 | Daigger et al. |
| 6,565,748 B1 | 5/2003 | Wang et al. |
| 6,613,232 B2 | 9/2003 | Chesner et al. |
| 6,669,849 B1 | 12/2003 | Nguyen et al. |
| 6,776,913 B1 | 8/2004 | Jangbarwala |
| 6,777,454 B2 | 8/2004 | Ritchie et al. |
| 6,783,681 B2 | 8/2004 | Mueller et al. |
| 6,824,685 B2 | 11/2004 | Katsu et al. |
| 6,864,397 B2 | 3/2005 | Kondo et al. |
| 6,926,832 B2 | 8/2005 | Collins et al. |
| 6,954,738 B2 | 10/2005 | Wang et al. |
| 6,982,037 B2 | 1/2006 | Horng et al. |
| 6,998,054 B2 | 2/2006 | Jangbarwala et al. |
| 7,025,884 B2 | 4/2006 | Mueller et al. |

FOREIGN PATENT DOCUMENTS

| | | |
|---|---|---|
| AU | 6053080 | 11/1980 |
| AU | 704376 | 4/1999 |
| AU | 705434 | 5/1999 |
| AU | 744706 | 2/2002 |
| AU | 749656 | 6/2002 |
| DE | 3938245 | 5/1991 |
| EP | 0117096 | 8/1984 |
| EP | 0522856 | 1/1993 |
| EP | 0540485 | 5/1996 |
| EP | 0605826 | 8/1997 |
| EP | 0779899 | 2/2000 |
| EP | 0781255 | 7/2000 |
| EP | 1303566 | 4/2003 |
| GB | 1559809 | 1/1980 |
| GB | 2273701 | 6/1994 |
| JP | 59049851 | 3/1984 |
| JP | 60132609 | 7/1985 |
| JP | 62141071 | 6/1987 |
| JP | 6102709 | 4/1994 |
| JP | 09047761 | 2/1997 |
| JP | 11309354 | 11/1999 |
| WO | 9321114 | 10/1993 |
| WO | 9400237 | 1/1994 |
| WO | 9607615 | 3/1996 |
| WO | 9607675 | 3/1996 |
| WO | 9851622 | 11/1998 |
| WO | 9947456 | 9/1999 |
| WO | 0204555 | 1/2002 |
| WO | 0244091 | 6/2002 |
| WO | 03057739 | 7/2003 |
| WO | 03082748 | 10/2003 |
| WO | 04087586 | 10/2004 |

OTHER PUBLICATIONS

Bolto et al. (1985) "Continuous Ion Exchange Using Magnetic Micro-Resins—The Continuous Sirotherm Desalination Demonstration Plant," AWWW 1985 Int. Conf. Proc. :282-288.

Bursill et al. (1985) "The Effect of Natural Organics on Water Treatment," AWWA 11th Federal Conv. 197-204.

Chriswell et al. (1977) "Comparison of Macroreticular Resin and Activated Carbon as Sorbents," J. AWWW Dec. :669-674

Galjaard et al. (2002) "Enhanced Pre-Coat Engineering (EPCE) for MF and UF: Steps to Full-Scale Application," Proc. IWA, ISSSN 0941-0961.

Laine et al. (2002) "Understanding Membrane Fouling: A Review of Over a Decade of Research," Proc. IWA, ISSN 0941-0961.

Lee et al. (2002) "Determination of Mass Transport Characteristics for Natural Organic Matter (NOM) in Ultrafiltration (UF) and Nanofiltration (NF) Membranes," Water Sci and Technol. 2(2):151-160.

Rook et al. (1979) "Removal of Trihalomethane Precursors from Surface Waters Using Weal Base Resins," Water Technol. Quality J. :520-524.

Shim et al. (2002) "Effects of Natural Organic Matter and Ionic Strength on Membrane Surface Charge," J. Environmental Sci Technol. 366(17):3864-3871.

Swinton et al. (1983) "Continuous Ion Exchange Using Magnetic Microbeads—Field Trials of a Transportable Pilot Plant," AWWW 10th Federal Convention 30-1-30-14.

Symons et al. (1992) "The Use of Anion Exchange Resins for the Removal of Natural Organic Matter from Municipal Water," International Water Conference Water Conference, Proceedings Book :92-120.

Tilsley et al. (1978) "Ion Exchange in the Water Industry—Interaction of Organic Matter with Anion Resins," Chem. Industry :142-149.

AMIAD Turbocelan Filters, http://www.amiadusa.com, Non dated.

Amy et al. (1999) "Interactions Between Natural Organic Matter (NOM) and Membranes: Rejection and Fouling," Water Sci Technol. 40(9):131-139.

Ariza et al. (2002) "Effect of pH on Electrokinetic and Electrochemical Parameter of Both Sub-Layers of Composite Polyamide/Polysulfone Membranes," Desalination 148:377-382.

Bourke et al. (Apr. 1999) "Scale-up of the MIEX DOC Process for Full Scale Water Treatment Plants," Water Corporation of WA., 18th Federal Convention, Australian Water, and Wastewater Association, Proceedings 11-14, Adelaide Australia.

Brattebo et al. (1987) "Ion Exchange for the Removal of Humic Acids in Water Treatment," Wat. Res. 21 (9):1045-1052.

Brown et al. (1974) "Anion Exchange Resin Performance in the Treatment of River Trent Water," Effluent Water Treat. J. 14:417-422.

Chai et al. (1988) "Charged Polyacrylonitrile Membranes Having Amphiphilic Quaternized Ammonium Groups for Ultrafiltration," Appl. Poly. Sci. 69(9):1821-1828.

Childress et al. (2000) "Relating Nanofiltration Membrane Performance to Membrane Charge (Electrokinetic) Characteristics," Environ. Sci. Technol. 34:3710-3716.

Cho et al. (2000) "Membrane Filtration of Natural Organic Matter: Comparison of Flux Decline, NOM Rejection, and Foulants During Filtration with Three UF Membranes," Desalination 127:283-298.

Cho et al. (2000) "Membrane Filtration of Natural Organic Matter: Factors and Mechanisms Affecting Rejection and Flux Decline with Charged Ultra Filtration (UF)," J. Memb. Sci. 164:89-110.

Cho et al. (1998) "Characterization of Clean and Natural Organic Matter (NOM) Fouled NF and UF Membranes, and Foulants Characterization," Desalination 118:101-108.

Christy et al. (2002) "High-Performance Tangential Flow Filtration: A Highly Selective Membrane Separation Process," Desalination 144:133-136.

Derwent Abstract Accession No. 86-281075/43, JP 61-204080A, Tokuyama Soda KK, Sep. 10, 1986.

Derwant Abstract Accession No. 92-288534/35, JP 04-197435, Sumitomo Chem. Co Ltd. Jul. 17, 1992.

Drikas et al. (Non dated) "Operating the Miex Process With Microfiltration of Coagulation,".

Drikas et al. (2002) "Removal of Natural Organic Matter—A Fresh Approach," Water Sci. Technol. 2(1):71-79.

Eldridge, R.J. (1995) "Moving-Bed Ion Exchange with Magnetic Resins," Rev. Chem. Eng. 11(3):185-228.

Feed Materials Production Center (Non-dated) "Potential Exposure Pathways," http://www.atsdr.cdc.gov/HAC/PHA/fer/fer_p2d.html.

Fu et al. (1989) "Mechanistic Interactions of Aquatic Organic Substances with Anion-Exchange Resins," Aquatic Humic Resources, Am. Chem. Soc. :797-811.

Galjaard et al. (2005) "Influence of NOM and Membrane Surface Charge on UF-Membrane Fouling," http://www.iwaponline.com/wio/2005/04/wio200504001.htm.

Hach Webpage (Downloaded Jan. 5, 2006) Browse by Parameter, Test for: copper, http://www.hach.com.

Hach webpage (Downloaded Jan. 5, 2006) DR/4000 Procedure, Methods8506 and Method 8026, http://www.hach.com.

Harries et al. (1984) "Anion Exchange in High Flow Rate Mixed Beds," Effluent Water Treatment J. 24:131-139.

Hongve, D. (1989) "Anion Exchange for Removal of Humus from Drinking Water. Calcium Improves the Efficiency of the Process," Water Res. 23(11):1451-1454.

Kaiya et al. (2000) "Analysis of Organic Matter Causing Membrane Fouling in Drinking Water Treatment," Water Sci. Technol. 41(10-11):P59-67.

Kavitskaya et al. (2003) "Adsorption of Anionic Surface Active Substances(SAS) on Charged Membranes," Desalination 158:225-230.

Kim et al. (Dec. 1991) "Using Anion Exchange Resins to Remove THM Precursors," Research and Technology J. AWWA 83:61-68.

Kim et al. (2003) "Evaluation of UF Membranes for Effective Effluent Organic Matter (EfOM) Removal with Hydrophilic Polymer Additives," AWWA Membrane Technology Conference.

Kunin et al. (1980) "Removal of Humic Material from Drinking Water by Anion Exchange Resins," Activated Carbon Absorption of Organics from the Aqueous Phase, vol. 2, Ann Arbor Science, Ann Arbor, pp. 425-441.

Lee et al. (2001) "Cleaning Strategies for Flux Recovery of An Ultra Filtration Membrane Fouled by Natural Organic Matter," Water. Resources 35(14):3301-3308.

MIEX DOC US Technical Brochure, Downloaded Jan. 5, 2006, http://www.miexresin.com.

Morran et al. (non dated) "Miex and Microfiltration—A Winning Alliance,".

Morran et al. (1996) "A New Technique for the Removal of Natural Organic Matter," AWWA Watertec Convention, Sydney.

Morran et al. (Mar. 1997) "A Simple Method to Reduce Disinfection By-Product Formation," 17th Federal Convention, Australian Water and Wastewater Convention, Proceedings 16-21, Melbourne Australia, pp. 373-379.

Mysels, K.J. (1959) Introduction to Colloid Chemistry, Interscience Publishers, New York, pp. 345.

Naumczyk et al. (1989) "Organics Isolation from Fresh Drinking Waters by Macroporous Anion-Exchange Resins," Water Res. 23(12):1593-1597.

Nguyen et al. (Mar. 1997) "DOC Removal by Miex Process, Scaling-up and Other Development Issues," 17th Federal Convention, Australian Wastewater Association, Proceedings 16-21, Melbourne Australia, pp. 373-379.

Odegaard et al. (1989) "Removal of Humic Substances by Ion Exchange," Aquatic Humic Resources, Am. Chem. Soc. :813-834.

Slunjski et al. (Apr. 1999) "MIEX DOC Process—A New Ion Exchange Process," Australian Water Quality Centre, 18th Federal Convention, Australian Water and Wastewater Association, Proceedings 11-14, Adelaide Australia.

Stone et al. (1993) "Charged Micropourous Membranes," Microelectronics Applications Notes.

Thurman et al. (1989) "Separation of Humic Substances and Anionic Surfactants from Ground Water by Selective Absorption," Aquatic Humic Substances: Influence on Fate and Transformation of Pollutants, American Chemical Society :107-114.

van Breemen et al. (1979) "The Fate of Fluvic Acids During Water Treatment," Wat. Res. 13:771-779.

Wlimelech et al. (1996) Water treatment Technology Program Report No. 10, Dec., U.S. Department of the Interior, Bureau of Reclamation.

Xenopoulos et al. (2003) Abstract from the Meeting of the North American Membrane Society, Biomedical Applications/ Bioseparations section of May 19, 2003, http://www.che.utoledo.edu/nams/2003/viewpaper.cfm?ID=426, accessed May 28, 2004.

* cited by examiner

INORGANIC CONTAMINANT REMOVAL FROM WATER

CROSS-REFERENCE TO RELATED APPLICATIONS

This application claims benefit of U.S. Provisional Patent Application No. 60/568,972, filed May 7, 2004.

BACKGROUND OF THE INVENTION

The present invention relates to water treatment, in particular to a process for the removal of inorganic contaminants from water.

Water supplies for drinking water often contain unacceptably high levels of inorganic ionic species. These inorganic ionic species include anions such as perchlorate, nitrate, bromide and bromate, other anions such as species containing arsenic V, arsenic III and chromium, as well as other inorganic anions known to the art to be removable by anion exchange agents; and inorganic cations such as ions of calcium, copper, nickel, magnesium, lead, mercury, cadmium and beryllium, and other inorganic ionic species known to the art to be removable by cation exchange agents.

Water containing such undesirable inorganic ionic species also often contains ions which compete with these undesirable inorganic ionic species for removal by ion exchange processes. Such competing ions include sulfate, silicate, nitrate, bicarbonate and dissolved organic carbon (DOC). Strong base anion exchange resins, such as the MIEX® Resin of Orica Australia Pty. Ltd. described in U.S. Pat. No. 5,900,146, which can be used to remove inorganic anions, typically have over six times the affinity for sulfate as for arsenate.

Conventional ion exchange resins have been used as water softeners to remove alkalinity from water in combination with purification treatments for removing inorganic contaminants. See, e.g., U.S. Pat. No. 4,839,057. A number of prior methods for removing inorganics from water using conventional ion exchange resins, e.g., as described in U.S. Pat. Nos. 5,149,437, 6,197,193, 6,203,705, and 5,494,582, have typically involved running the water through a column packed with the resin, or a resin bed. U.S. Pat. No. 6,200,471 discloses the use of a conventional ion exchange resin within a water bottle.

U.S. Pat. No. 5,595,666 discloses the use of a magnetic polymer resin for removal of actinides from contaminated water. The resins comprise polyamine-epichlorohydrin resin beads with ferrites attached to the surfaces of the beads, and contaminated water is flowed through a packed column of these beads.

U.S. Pat. No. 5,900,146 discloses magnetic and nonmagnetic ion exchange beads having solid particulate material, which is magnetic or responsive to magnetic force, distributed throughout the beads. PCT Publication WO 96/07615 discloses dispersing particulate magnetic ion exchange agent in water being treated for removal of dissolved organic carbon in an amount between 0.05 and 5 ml wet resin per liter of water. The preferred ion exchange resin is a magnetic resin. U.S. patent Publication No. US 2002/0121479 A1 also discloses use of particulate magnetic ion exchange resin dispersed in water in a water purification process. None of these publications disclose methods for using such particulate ion exchange resins for removal of inorganic ionic species down to acceptable levels, which are often in the range of parts-per-billion for drinking water. The MIEX® resin described in U.S. Pat. No. 5,900,146 has been used to remove dissolved organic carbon down to the parts-per-million level.

However, the removal of some toxic inorganic ionic species from water down to the parts-per-billion (ppb) level is necessary in order to provide high quality water suitable for distribution and consumption. For example, EPA standards currently require no more than 50 µg/L (50 ppb) arsenic in drinking water. This Maximum Contaminant Level (MCL) will be reduced to 10 µg/L in January 2006. MCLs for chromium and perchlorate are due to be set in the near future.

Removal of contaminating inorganic anions by ion exchange in the presence of competing ions such as sulfate, nitrate, bicarbonate and dissolved organic compounds present in the water has not heretofore been widely adopted primarily because the competing ions exhaust the resin before significant amounts of the target inorganic anions (e.g., arsenate) have been removed, or because unless the contact time between the water and resin is carefully calibrated and constantly readjusted to account for small concentration differences, there is a significant risk of breakthrough and chromatographic peaking events. Thus, frequent regeneration of the resin and the need for careful monitoring of the process can make removal of such contaminating ions by means of ion exchange resins too difficult to operate to be viable. When silicate is present as a competing ion, fouling of the ion exchange resin is a severe problem in inorganics removal by means of ion exchange columns. In such cases, it is believed that the resin particles become coated with polymerised silicate, leading to an impenetrable layer of solid material on and near the surface of the bed, resulting in the columns becoming inoperable for inorganic ionic species removal.

This invention fulfills the need for a water treatment process which can economically remove inorganic ionic species contaminants from water while eliminating breakthrough and chromatographic peaking.

All publications referred to in this patent application are incorporated by reference to the extent not inconsistent herewith for their teachings of known water processing steps, systems, and reagents.

SUMMARY OF THE INVENTION

This invention provides a method for removing an inorganic ionic species contaminant (or combinations of contaminants) from water containing an unacceptably high concentration of said contaminant(s), said method comprising: dispersing an ion exchange resin in water, or blend of ion exchange resins with different ion exchange site chemistries, capable of adsorbing said inorganic ionic species contaminant(s); separating ion exchange resin loaded with said inorganic ionic species contaminant(s) for regeneration and adding to the water replacement ion exchange resin in amounts sufficient to remove said inorganic ionic species contaminant(s) in said water down to an acceptable concentration. Preferably, the ion exchange resin is a magnetic ion exchange resin.

The inorganic ionic species contaminants include both simple and complex ions. The inorganic ionic species may be anions such as perchlorate, sulfate, nitrate, bromide and bromate, and other anions such as species containing arsenic and chromium, and inorganic cations such as ions of sodium, potassium, calcium, copper, nickel, magnesium, lead, mercury, cadmium and beryllium. This invention is capable of treating water for the removal of both simple ions involving a single charged atom, or complex ions involving a charged complex comprising more than one atom, such as chromate or perchlorate.

Organometallic ions comprising both carbon and inorganic atoms, e.g. organomercury, organoarsenic, organochromium, and other such ions found as contaminants in raw water, are not included in "inorganic ionic species" as used herein. However, the process of this invention may also be used to remove such ions and the teachings herein with respect to inorganic ionic species also apply to organometallic species.

The process is especially suited for treating water to make it acceptable for human consumption as drinking water.

DETAILED DESCRIPTION

Figure 1:
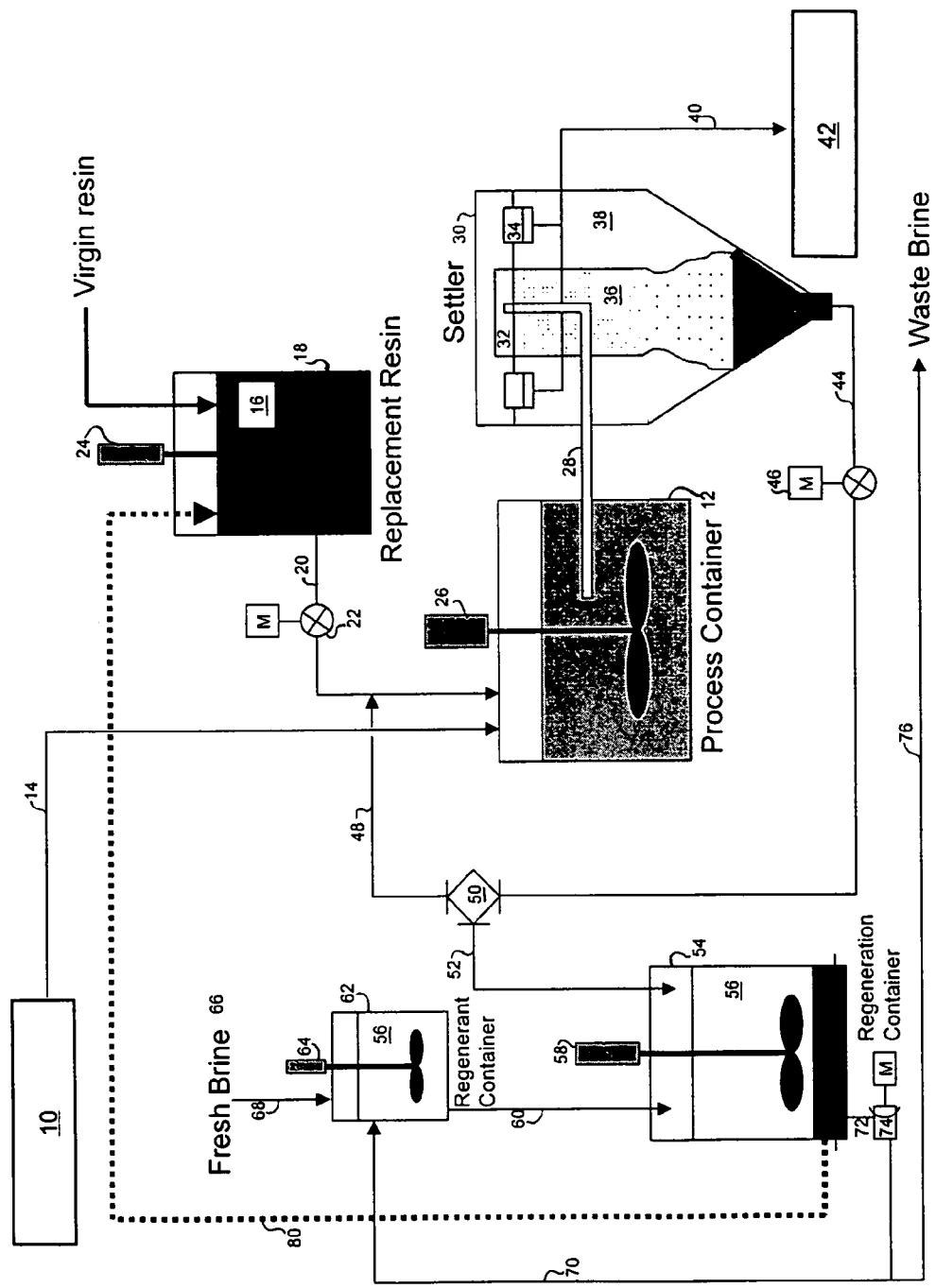
FIG. 1 is a process flow diagram showing the process of this invention for treating raw water with magnetic ion exchange resin, and regenerating and recycling the resin.

The process of this invention is capable of treating water having unacceptably high levels of inorganic ionic species, i.e., concentrations greater than acceptable concentrations permitted by law or recommended health standards for water intended for the purpose for which the water is to be used. The process is capable of removing the inorganic ionic species down to levels of less than about 5 μg/L.

This process is capable of treating water intended as drinking water for human consumption. The process can remove inorganic contaminants down to any desired level. For example, the process is capable of treating water containing up to about 150 μg/L arsenic V, to remove this ion down to an acceptable concentration of no more than 5 μg/L; of treating water containing up to about 150 μg/L arsenic to remove this ion down to an acceptable concentration of no more than about 5 μg/L; of treating water containing up to about 150 μg/L chromate VI to remove this ion down to an acceptable concentration of no more than about 2 μg/L; and of treating water containing up to about 50 μg/L perchlorate to remove this ion down to an acceptable concentration of no more than about 2 μg/L.

Loaded ion exchange resin (also referred to herein as "used ion exchange resin") is resin on which some available sites have been taken up by ions from the water. Loaded resin may still have sites available for taking up contaminant ions. Exhausted ion exchange resin has substantially all its available sites occupied, such that the exhausted resin is substantially unable to take up additional ions from the water. Preferably, loaded ion exchange resin, which may or may not include exhausted ion exchange resin, is regenerated, e.g., by contacting it with a regenerant solution, such as a saline solution, preferably brine, and returning it to the process container as "regenerated ion exchange resin". Any used ion exchange resin that is not regenerated can be reused in the process, this being referred to herein as "recycled resin". Ion exchange resin added to any process container to replace that which is lost to the process in treated water and/or removed for regeneration is referred to herein as "replacement resin". Replacement ion exchange resin includes regenerated resin, and brand new resin which has not previously been used in the process but which is added to make up for loss of resin from the process in product water, and is herein referred to as "virgin resin". The virgin resin may be added directly to the process container or may be added to a replacement resin holding container also containing regenerated resin, which is supplied to the process container.

In contrast to previously-known ion exchange processes for removal of inorganic ionic species, the process of this invention prevents breakthrough and chromatographic peaking. In these previously-known processes, it is essential to be able to predict the time at which the ion exchange resin in the column will be completely exhausted, so that it can be taken off line and replaced with a fresh column. Complete exhaustion of the ion exchange resin in the column means that the amount of contaminating ion in the effluent from the column is the same as that in the influent to the column. The concentration of the contaminating ion in the effluent rises rapidly when the column becomes completely exhausted. However, there are no rapid in-line methods for accurately measuring the concentration of many contaminating ions (such as arsenic) in the effluent stream. Typically, effluent stream concentrations of contaminating ions are analyzed at different time points as part of process design, and the time at which effluent concentration of contaminating ion equals a predetermined fraction of the known concentration of contaminating ion in the influent stream (the breakthrough point) is used to predict when the columns should be taken off line. This will be a time slightly earlier than the breakthrough point. However, if the concentration of contaminating ion increases in the influent stream while the process is running, actual breakthrough will occur earlier than the predicted breakthrough point, and by the time the column has been taken off line, the concentration of the contaminating ion in the effluent stream will exceed desirable levels. Thus, previous ion exchange processes for inorganic ionic species removal carry a risk of releasing contaminated water to water supplies meant for human consumption.

Chromatographic peaking occurs when contaminating ions are being removed by conventional column ion exchange processes in the presence of competing ions for which the ion exchange resin has greater selectivity. In these processes, competing ions in water flowing into the top of the column load the resin at the top of the column and once the competing ions have been removed from the water, the contaminating ions load the resin lower in the column. As water continues to enter the column, competing ions will replace contaminating ions already loaded on the resin, and the contaminating ions will continue to move lower on the column. The resin will continue to remove contaminating ions until all the resin has become exhausted. At this point, the resin will not remove any more contaminating ions, and the competing ions will continue to replace the contaminating ions already loaded on the resin, so that the effluent will contain not only the contaminating ions that were present in the influent stream, but also the contaminating ions being displaced from the resin by competing ions. The effluent concentration of contaminating ions will temporarily be even greater than the influent concentration. As is the case with breakthrough, the problem arises in accurately predicting when chromatographic peaking will occur so that the column can be taken off line before that time. An increase in competing and/or contaminating ion concentration in the influent stream can cause chromatographic peaking to occur earlier than predicted, with potentially disastrous results for the quality of the effluent water.

The process of this invention prevents breakthrough and chromatographic peaking because replacement ion exchange resin is constantly being supplied to the process and loaded resin is constantly removed from the process for regeneration, thus preventing a situation in which all the resin is exhausted at once.

The process of this invention further prevents rapid fouling of the ion exchange resin, e.g., by silicates, because the movement of the resin particles in circulation in the process lines and containers negates the opportunity for the polymerisation and fouling which occurs on packed, stationary resin beds.

The process of this invention is capable of treating water having a total alkalinity of up to at least about 300 mg/L $CaCO_3$. High turbidity levels, up at least about 100 NTU do not interfere with the adsorption of inorganic ionic species contaminants.

When the inorganic ionic species contaminant is in a valence state such that in itself it cannot be readily removed by ion exchange, e.g., arsenic III, the process also includes a step of converting the contaminant to a form that is readily removed by ion exchange. In the case of arsenic III for example, this involves oxidising the arsenic III to arsenic V, in which valence state it will be taken up by the ion exchange resin. Similarly, one type of ionic species may be reduced or otherwise chemically changed to convert it to another ionic species that is more amenable to ion exchange removal. For example, metallic oxides can be converted to metallic ions prior to conducting the ion exchange process of this invention. For example, metallic oxides can be converted to metallic ions prior to conducting the ion exchange process of this invention.

This conversion step may be done prior to adding the water containing the contaminant to the process container, or may be done in the process container.

The conversion may be carried out by means known to the art, e.g., by contacting arsenic III ions with ozone, such as by introducing ozone into the water in an amount up to about 20 mg ozone gas per liter of water. This ozone treatment may be part of a conventional ozone disinfection step performed prior to contacting the water with the ion exchange resin. The arsenic III ions may also be oxidized to arsenic V by contacting the arsenic III ions with chlorine, peroxide, permanganate or other oxidants known to those skilled in the art.

Other purposes for which water treated by this process may be used include industrial applications, mining applications, remediation and food processing applications, as well as waste water treatment. Typically, water used for these purposes is permitted to contain higher levels of inorganic ionic species contaminants than water used for human consumption.

In one embodiment the process includes contacting water containing contaminating ions with an ion exchange resin, or blend of ion exchange resins with different ion exchange site chemistry, preferably a magnetic ion exchange resin, in a process container, removing the ion exchange resin from the process container, for example by flowing water from the process container into a separator or settler where, in the case of magnetic resin, the resin is agglomerated and settles to the bottom of the container for separation; then removing and regenerating a portion of the separated resin and recycling both the remaining separated resin and the regenerated resin to the process container. In another embodiment, the process container may include a separator or settler therein, e.g., where a settling basin is used and resin separated at the separating end is continuously pumped back to the front end for exposure to the water flow, as in PCT Publication WO 96/07615 incorporated herein by reference.

Contaminating inorganic ionic species can be removed down to any desired concentration. If monitoring the treated water shows an unacceptably high level of the undesired inorganic ionic species, the process may be repeated. When a single pass through the process container and settler does not remove the contaminating ions down to the desired level, more resin can be added to the system, a greater portion of the resin can be regenerated during a given time period, or the process can be repeated either in the original equipment or an additional process container and an additional settler to receive outflow therefrom can be added to the system. Other parameters may also be changed as will be appreciated by those of skill in the art and as taught herein, in order to reduce effluent concentrations of contaminating ions.

The process container in which the process can be conducted may be any container known to the art for treating water and includes process tanks used for batch-wise or continuous processes, as well as conduits. Water may be placed in a process container or flowed into a process container by any means known to the art, e.g., by pumping or gravity feed.

It is preferred that the ion-exchange resin particles are magnetic and that they have a diameter less than about 250 µm, more preferably in the range of from about 50 µm to about 200 µm. Particles in this size range can be readily dispersed in the water and are suitable for subsequent separation from the water. The size of the resin particles affects the kinetics of adsorption of inorganic ionic species and the effectiveness of separation. The optimal size range for a particular application can be readily determined by one skilled in the art without undue experimentation.

The magnetic ion-exchange resin particles can have a discrete magnetic core or have magnetic particles dispersed throughout the resin particles. In resin particles which contain dispersed magnetic particles it is preferred that the magnetic particles are evenly dispersed throughout the resin particles.

It is preferred that the ion-exchange resin particles be macroporous in order to provide the particles with a large surface area onto which the inorganic ionic species can be adsorbed. Macroporous (or macroreticular) is a term known to the art as applied to the bead structure of certain ion exchange resins which have a rigid structure with large discrete pores, typically manufactured using a porogen.

The water treatment process of this invention preferably involves agitating the resin particles in contact with water so as to expose inorganic ionic species contaminants in the process container to maximum surface area on the resin. Agitation is also preferred during resin regeneration so as to expose the regenerant solution to maximum surface area on the resin being regenerated. In the processes of this invention, water containing the resin particles can also be flowed and/or pumped and subjected to other operations that can deleteriously affect the ion-exchange resin. It is therefore preferred that the resin be manufactured in such a way, with a significant degree of crosslinkage, so as to form polymeric particles that are tough but not brittle. Toughening agents may be used as known to the art and as disclosed in PCT Publication WO 03/057739. Thus, the magnetic particles dispersed throughout the polymeric beads of the preferred embodiment are not easily removed from the beads during conveying, pumping and mixing.

A preferred magnetic ion exchange resin (or one resin in the blend) for use when the inorganic ionic species contaminant is selected from the group including perchlorate, sulfate, nitrate, phosphate, phosphite, bromide and bromate, and species containing arsenic V, chromium, is a strong base anion exchange resin such as the MIEX® resin of Orica Australia Pty. Ltd. Inc. described in U.S. Pat. No. 5,900,146.

Strong base ion exchange resins, and in particular the MIEX® ion exchange resin, are capable of adsorbing any inorganic ionic species having a higher selectivity than chloride, generally in accordance with the following indicative Order of Selectivity (Table 1).

TABLE 1

Fluoride < Acetate < Formate < Iodate < Dihydrogen Phosphate < Bicarbonate < Hydroxide < Bromate < Chloride < Cyanide < Bisulfite ≈ Nitrite < Bromide < Nitrate < Bisulfate < Iodide < Sulfate < Chromate < Perchlorate In another embodiment, the ion exchange resin (or one resin in the blend) is a weak base ion exchange resin such as those described in PCT Publication WO 03/057739 published Jul. 17, 2003, and the inorganic ionic species contaminant is selected from the group including hydrogen sulfide, bicarbonate, the hydrogen sulfate ion, selenate, copper, cadmium, cobalt, mercury, zinc, and other inorganic anions known to the art to be capable of being removed by such ion exchange resins.

In a further embodiment, the ion exchange resin (or one resin in the blend) is a strong acid ion exchange resin known to the art, and the inorganic ionic species contaminant is selected from the group including sodium, potassium, nickel, calcium, magnesium, manganese, iron, cobalt, and other inorganic cations known to the art to be capable of being removed by such ion exchange resins.

In a still further embodiment, the ion exchange resin (or one resin in the blend) is a weak acid ion exchange resin known to the art and the inorganic ionic species contaminant is selected from the group including sodium, potassium, calcium, magnesium, manganese, copper, and nickel, and other inorganic cations known to the art to be capable of being removed by such ion exchange resins.

The magnetic ion exchange resin is dispersed in the water by any means known to the art so as to increase the surface area of resin in contact with the water and available to adsorb the inorganic ionic species. Typically the resin is dispersed by mechanical agitation such as stirrers and the like, mixing pumps immersed in the water, or air agitation where a gas is bubbled through the water. Sufficient shear needs to be imparted to the water to achieve dispersal of the resin.

In some small-scale operations, the magnetic ion-exchange resin may be dispersed in a semi-fluidised bed, provided pumping costs are not economically unfeasible. The use of a semi-fluidised bed is not only a convenient means for dispersal of the ion-exchange resin but provides for the ready separation of the loaded resin from the water once inorganic ionic species have been adsorbed onto the ion-exchange resin.

Agglomeration of magnetic ion-exchange resin loaded with inorganic ionic species contaminant, in order to separate it from the treated water, is achieved by removing the shear, at which point the magnetic particles in the resin cause the resin to agglomerate. The agglomeration may be facilitated by the use of tube settlers and other means known to those skilled in the art.

In a preferred embodiment, the ion-exchange resin particles are more dense than the water and tend to settle to the bottom of the tank. This settling facilitates separation of the loaded resin from the water. Settling can be facilitated by the use of tube settlers and the like. The resin may then be collected by any means known to the art, including vacuum collection, filtration through a mesh of appropriate porosity, magnetic filtration, and magnetic transport such as belts, discs, drums, and the like. It is preferable that the separation and collection means do not cause undue mechanical wear which may lead to attrition of the resin. In one embodiment, resin is removed from the process container by means of a resin separator such as high gradient magnetic filters, magnetic coils, magnetically stabilised fluidised beds, or by other means known to those skilled in the art.

When a continuous, fully suspended system is used, the resin may conveniently be separated from treated water by gravity settling. Based on resin characteristics, very effective (>99% solids removal) gravitational settling is achieved in high-rate settling modules with retention times less than about 20 minutes.

In one process for separating the ion-exchange resin from the water the bulk of resin particles settle out in the first quarter of a separating basin length which is devoid of settler modules ("free-flowing" settling). Further removal of resin particles ("enhanced" settling) from treated water is performed in the settler compartment filled with modules which may be either tilted plates or tubular modules. The bottom of the settler is designed for collection of resin particles in cylindrical, conical or pyramidal hoppers from which the resin particles are pumped back to the front of the process. In this process, some mixing of the settled resin in the hoppers may be required to keep it in a fluid condition and to ensure uniform resin concentration of resin in the recycle system.

It is preferred that the process be conducted continuously, adjusting flow rates and/or resin dose as necessary, until the level of inorganic ionic species contaminants is within acceptable levels. The process may also be conducted batchwise, and repeated as necessary to reach desired purity levels. Water partially purified in one process container may be placed in a second process container for further treatment with the ion exchange resin. Preferably, when a second process container is used, water is flowed through a first process container, then into a first settler, from there into a second process container, and then to a second settler. In one embodiment, the resin from each settler is recycled to the corresponding process container, with a portion of the resin from each settler being regenerated and recycled to the corresponding process container or replacement resin storage tank. In another embodiment, recycled resin from the second settler is recycled to both the second and first process containers, replacement resin is added to the second process container only and all of the resin captured from the first settler is sent for regeneration.

In one embodiment, water is continuously flowed into the process container and out of the process container, and replacement resin is periodically added to the process container. In another embodiment, water is continuously flowed into and out of the process container, and replacement resin is also continuously added to the process container. In these continuous processes, water is preferably flowed into and out of the process container at a rate of about one process container volume every 2 to 40 minutes. Recycled resin is also preferably added to the process container continuously.

In another embodiment, water is flowed into the process container periodically, and recycled and replacement resins are added to the process container periodically.

The process is effective for removing a range of target ions in the presence of a range of possible competing ions. For example, at chromium (VI) contaminant concentrations of up to about 150 µg/L, this process is effective in removing over 90% of chromium (VI) in the presence of competing sulfate ion concentrations of up to about 100 mg/L, to about 200 mg/L, and even higher, e.g., about 250 mg/L. In a further example, arsenic (V) contaminant concentrations of up to around 100 µg/L can be reduced by 85% or more in the presence of competing silicate at concentrations up to about 100 mg/L to about 150 mg/L.

A given ion, e.g., sulfate may be considered to be a competing ion under some circumstances, and an undesired inorganic ionic species to be removed under other circumstances. The process can be adjusted in accordance with principles taught herein and known to the art to remove more or less of such ions as is required by the particular process.

In continuous processes of this invention, it is important that sufficient replacement resin be added to the process in a timely manner to prevent exhaustion of the resin, i.e., loading of substantially all the sites on the ion exchange resin particles in the process container with contaminant ions and competing ions. Exhaustion of the resin, when substantially all the sites on the resin particles are loaded with contaminant ions, means that subsequent removal of the target contaminant will effectively cease. Preferably, an equal amount of replacement resin is added to the process container to offset the loaded resin being removed from the process for regeneration.

The amount of regenerated resin that is returned to the process, which is "sufficient to remove said inorganic ionic species contaminants in said water down to acceptable concentrations," can be an amount which is at least the minimum required for this purpose, and preferably this amount includes no more than about 20% excess over the minimum required, more preferably no more than about 10% excess.

If the competing ions are taken up on the resin in preference to the inorganic ionic species contaminants (i.e., if the ion exchange resin has greater selectivity for the competing ions than for the inorganic ionic species contaminants), and/or if competing ion concentration in the water is greater than inorganic ionic species contaminant concentration, the process can be operated continuously, in contrast to previously-known ion exchange resin column processes, by adding more resin to the process until the effluent concentration of the selected inorganic ionic species to be removed reaches desired levels.

In batch-wise processes, the water must remain in contact with the ion exchange resin for a period long enough to take up the required amount of the inorganic ionic species contaminants, but not so long as to favour replacement of these ions on the resin by competing ions. Preferably, the contact time in batch processes is in the range about 2 minutes to about 40 minutes.

Process parameters, i.e., resin dose, contact time, and regeneration rate, can be determined by one skilled in the art for any given process, applying art-known principles and the teachings of this specification. Exemplary process parameters for particular processes are provided in the Examples hereof.

In a typical process, no more than about 0.1% percent of the magnetic ion exchange resin will be lost in the purified water stream, and preferably no more than about 0.01% percent of the resin that is added to the process container will be lost. Virgin resin is then added to the process container as needed to replace the resin that is lost. The balance of the replacement resin required for the ongoing process is regenerated resin. Resin lost to the process may be further reduced by use of a filter unit to capture resin in the stream exiting any container that is used to contain resin and from which resin may be lost.

The resin is regenerated in a batch process, or continuously as described hereinafter, by contact with a regenerant solution capable of causing the inorganic ionic species contaminants to be displaced from the resin. For example, this may occur by using a regenerant solution that alters the pH of the system, thereby removing the interaction between the resin and the contaminant, upon which the contaminant dissolves in the regenerant solution.

Alternatively, the regenerant solution may contain an ion that is capable of directly displacing the contaminant from the resin. The ion in the chosen regenerant solution may not be preferred by the resin in terms of its selectivity, but in this event it needs to be present in sufficient concentration in the regenerant solution to make the displacement effective. In the latter case, the concentration of the regenerant solution is preferably between about 1% and about 20% of the salt containing the displacing ion.

Preferably this ion is chloride, and the regenerant solution is a brine solution. The term "brine" means any high concentration salt solution capable of causing the desorption of inorganic ionic species from the resin. High concentration saline solutions, e.g., at least about 10% NaCl, which are one form of brine, are particularly useful as regenerating fluids in the present process, particularly where strong base resins are used.

Typically, the resin can be regenerated and reused indefinitely without having to change the total resin inventory, since the small amount of resin loss to the system and its replacement with virgin resin maintains the condition of the total inventory over the long term.

Loaded resin is regenerated in a resin regenerator where it is contacted with the regenerant solution, e.g., brine, and from thence the regenerated ion exchange resin is conveyed back to the process container as replacement resin, or to a holding container from which it is conveyed to the process container. In one embodiment of this invention, two resin regenerators can be used so that when a first regenerator is full, loaded resin underflow from the process container or resin separator can be directed to the second regenerator. The resin regenerator may be an external column using a regenerant solution to regenerate the ion exchange resin, or a separate regeneration container, which may be a fixed bed (plug flow) or a container with an agitator to disperse the resin, in which resin is contacted with the regenerant solution, such as by adding the loaded magnetic ion-exchange resin to the solution, dispersing it in the solution, agglomerating the regenerated magnetic ion exchange resin, and separating the regenerated resin from the regenerant solution. Regeneration may be performed continuously or batchwise. The ratio of regenerant fluid to ion exchange resin slurry is preferably between about 1:1 to about 10:1, more preferably between about 2:1 and about 5:1.

In batch processes, the process container may be used as the resin regenerator after removal of the purified water, by adding saline regenerant solution to the process tank, as described in U.S. patent Publication No. US 2002/0121479 A1.

The solution used to regenerate the ion exchange resin may be reused, and typically can be reused between about 5 and about 25 times. Typically, about 0% to about 20%, and more preferably about 1% to about 10% volume percent of the recycled regenerant solution is taken off to waste per use. Make-up regenerant solution can be added to the regeneration container or to a separate regenerant solution supply vessel to replace the volume taken off in the waste stream. The remainder of the used regenerant solution can be recycled to the regenerant solution supply vessel or the regeneration container for reuse.

Any portion of the solution containing inorganic ionic species contaminants that is removed as a liquid waste stream from the used regenerant solution exiting the regeneration container can be further treated by a method known to the art such as ferric precipitation, flash distillation, or spray evaporation, in order to remove the contaminant from the liquid waste.

Purified water leaving the process container can be filtered as it leaves the process container, e.g., by means of a membrane filter such as the ZEWEED® filter described in U.S. Pat. No. 5,120,688 placed directly in the process tank as described in U.S. patent Publication US 2002/0121479 A1, or by other filtration means known to the art.

Most ground water contains dissolved gases that are capable of forming small gas bubbles under ambient temperature and pressure conditions. For the purpose of this invention, source water is considered to be aerated when it contains enough dissolved gases (notably oxygen and carbon dioxide) that bubbles of these gases are formed in the water within the time frame that it takes the water to pass through the treatment process. When the ion exchange resin is in contact with aerated water, some of the particles may attach to the bubbles, and thus be prevented from agglomerating and settling. Thus, to minimise loss of ion exchange resin with the purified water stream, it is desirable to deaerate water which tends to form bubbles during treatment, prior to placing it in contact with the ion exchange resin, i.e., prior to placing the water in the process container, or at least prior to separating the water from the ion exchange resin. Deaeration may be performed by any means known to the art, such as by spraying and then collecting the water. The same problem may occur during the ion exchange resin regeneration step if the solution used for regeneration is aerated and likely to form bubbles during the period of time it is being regenerated. Preferably, the water used to prepare the regenerant solution is also deaerated before use.

In the process of the present invention the amount of ion-exchange resin necessary to remove inorganic ionic species from water is dependent on a number of factors including the level of inorganic ionic species initially present in the water to be treated, the nature of the inorganic ionic species, the desired level of inorganic ionic species in the treated water, type and concentration of competing ions, salinity, total alkalinity, hardness, temperature, pH, and the rate at which it is desired to treat the water to remove the inorganic ionic species.

The ratio of raw water to be treated to ion exchange resin slurry in the process container is preferably kept between about 11.5:1 (80 mL of resin slurry per liter of resin slurry/water mixture) and 199:1 (5 mL/L), more preferably between about 19:1 (50 mL/L) and 32.3:1 (30 mL/L).

In a typical process in which chromium is to be removed from water containing up to about 100 µg/L chromium, down to a level between about 5 and about 10 µg/L, the amount of magnetic ion exchange resin used is preferably between about 10 mL/L and about 60 mL/L, and more preferably between about 30 mL/L and about 50 mL/L.

Preferred ion-exchange resins are recyclable and regenerable. Recyclable resins can be used multiple times without regeneration and continue to be effective in adsorbing inorganic species. Regenerable resins are capable of treatment to remove adsorbed inorganic ionic species from the resin, and such regenerated resins can then be re-introduced into the treatment process. Depending on water quality, only a small portion of the resin needs to be regenerated before recycling, e.g., about 20% or less, or more preferably, 10% or less. The amount of resin to be recycled depends on the contaminating inorganic ionic species, the level and type of competing ions, the amount of contaminating ions in the water to be treated, and percent removal required to achieve the desired purity in the treated water. In general, a higher percent removal of inorganic ionic species is required in the treatment of drinking water than the percent removal required for dissolved organic compounds (DOCs).

The process of the present invention is readily incorporated into existing water treatment facilities. For example, it may be used upstream of processes such as conventional coagulation, sedimentation/filtration, filtration, membranes or any combination of processes as the water quality, treatment requirements or other circumstances dictate.

Alternatively, the current process may be used as a stand-alone inorganic contaminants removal process.

In the following detailed description of the figures, the same numbers in different figures designate the same elements.

FIG. 1 is a process flow diagram illustrating one embodiment of this invention. Raw water 10 is continuously flowed into process container 12 through raw water line 14. Replacement magnetic ion exchange resin 16 in suspension in water is flowed from replacement resin holding container 18 into process container 12 through replacement resin line 20 which is equipped with a pump and motor 22 so that replacement resin can be added continuously to process container 12. Replacement resin holding container 18 is equipped with an agitator 24 to keep the resin particles in suspension. Process container 12 is also equipped with an agitator 26 to keep the resin particles in the container in suspension. While in contact with the raw water in process container 12, the magnetic ion exchange resin adsorbs inorganic ionic species contaminant.

Water containing magnetic ion exchange resin particles which have adsorbed inorganic ionic species contaminant is continuously drawn off from process container 12 through conduit 28, and conveyed to feedwell 32 in settler 30 for separation of the loaded resin. Feedwell 32 allows resin bead agglomeration to take place. The magnetic resin particles 36 in feedwell 32 are not under shear force from an agitator, and tend to agglomerate due to their magnetic attraction to each other. The agglomerates settle to the bottom of settler 30 leaving the product water 38 substantially free of resin. Settler 30 also comprises two weirs 34 for transferring the product water out of the settler.

Product water 38 is conveyed through product water line 40 to product water container 42.

A slurry of separated resin exits the bottom of settler 30 through separated resin line 44 which is equipped with pump and motor 46 to control the flow of the resin slurry, and may be recycled through recycle resin line 48 which joins replacement resin line 20 upstream of its entry into process container 12. Resin recovery rates through the settler of greater than 99.9% are achieved at settler rise rates of over 15 m/hr (6 gpm/sf).

Separated resin line 44 is equipped with a three-way valve 50, through which a portion of the separated resin is drawn off through regeneration line 52 and conducted to regeneration container 54 containing a regenerant solution 56. The regenerant solution 56 is conducted into regeneration container 54 via regenerant line 60 from regenerant container 62 which is supplied with fresh regenerant from fresh regenerant container 66 through fresh regenerant line 68. Regenerant container 62 is also supplied with recycled regenerant through regenerant recycle line 70. Regenerant container 62 is equipped with agitator 64 to mix the desired reagent with water and assist in regenerant preparation.

Regeneration container 54 is equipped with agitator 58 to keep the resin particles in suspension in the container. The contaminants exit regeneration container 54 with used brine through used brine line 72, passing through pump (with motor) 74. A portion of the used regenerant is drawn off from used regenerant line 72 as waste regenerant into waste regenerant line 76 where it is conducted to disposal or further treatment to remove the inorganic ionic species contaminants.

The remainder of the used regenerant is recycled to regenerant container 62 through regenerant recycle line 70.

A slurry of regenerated resin particles is flowed or pumped from regeneration container 54 through regenerated resin line 80 into replacement resin container 18.

EXAMPLES

An example (Example 1) of arsenic V-containing water typically has in the range of about 49-55 µg/L arsenic, predominantly as arsenic V, and around 90 to 110 µg/L silicate. Jar tests on this water revealed that the kinetics of arsenic uptake were very fast, however, the uptake of the competing silicate ion took a lot longer. The residual arsenic concentration (3-7 µ/L) was reached in ten minutes, whereas the majority of silicate removal occurred between ten and thirty minutes.

To optimise the performance of the resin in some inorganics removal systems, it is preferential to minimise the contact time. This allows the rapid uptake of the arsenic but reduces the uptake of competing ions, thus reducing the required regeneration frequency.

In a further example (Example 2), surface water having 2.5-3.6 µg/L perchlorate with extremely high sulfate levels of over 200 mg/L was used. Perchlorate removal of about 50% or higher was achieved. Despite the fact that ion exchange resins have a higher affinity for perchlorate than sulfate, this is a significant result given the fact that there was 500 times more sulfate than perchlorate in the raw water.

Example 3 shows removal of chromium VI (spiked concentration 100 µ/L), from raw water with very high sulfate concentration (around 140 mg/L) and total dissolved solids of 900 mg/L. Using a resin dose of 60 mL/L and a contact time of 35 minutes, consistent removal of chromium VI of greater than 90% was obtained. Resin dose was found to be the most consistent predictor of removal success.

All percentages used herein are by weight unless otherwise stated. The ion exchange resin used was MIEX® resin of Orica Australia Pty. Ltd.

Example 1

Arsenic V Trial

A trial was undertaken to assess arsenic removal from a water under continuous flow conditions of raw water containing a stable influent arsenic level in the range of 49.9 to 54.2 µ/L arsenic, predominantly as arsenic V, with a silica background in the water of around 100 to 110 µg/L and a sulfate background of about 12 to 15 mg/L. The water processing facility in which the test was conducted uses ground water having a daily capacity of 4 million gallons per day (MGD). It currently does not apply any form of pretreatment before delivering water to the distribution system. New contaminant guidelines require a maximum of 10 µg/L total arsenic for drinking water.

A three-week trial was undertaken to demonstrate the ability of the magnetic resin process of this invention to remove arsenic from the ground water supply down to a level of 10 µg/L or less. The trial was conducted using a two-gallon-per-minute (2 GPM) pilot plant set-up similar to that shown in FIG. 1.

The regeneration rate was held constant at 10% throughout the trial because previous bench work had shown that regeneration rate was not a key variable for maximising arsenic removal in this particular system.

Operating conditions and analytical results are shown in Table 2. Six sets of operating conditions were used. Samples were taken twice daily. During the trial, the influent arsenic level was very stable, in the range 49.9 to 54.2 µg/L. Effluent arsenic levels varied according to the operating conditions applied.

Table 2 shows the effluent arsenic averages and average percentage arsenic removals under each set of conditions. Arsenic removal rates varied between 65% and 86%.

TABLE 2

Segmented Arsenic Removal Data for the Arsenic Trial

| Average Resin Dose (ML/L) | Contact Time (Min) | Average Effluent Arsenic Level (ppm) | Average Removal (%) | Duration (Days) |
|---|---|---|---|---|
| 31.0 | 31 | 7.6 | 85.6 | 3½ |
| 30.0 | 15 | 7.4 | 85.2 | 1 |
| 16.1 | 31 | 15.6 | 69.7 | 3½ |
| 16.2 | 15 | 18.3 | 64.6 | 3 |
| 36.0 | 22.5 | 8.2 | 84.4 | 3 |
| 37.5 | 15 | 7.5 | 86.2 | 1 |

Figure 2:
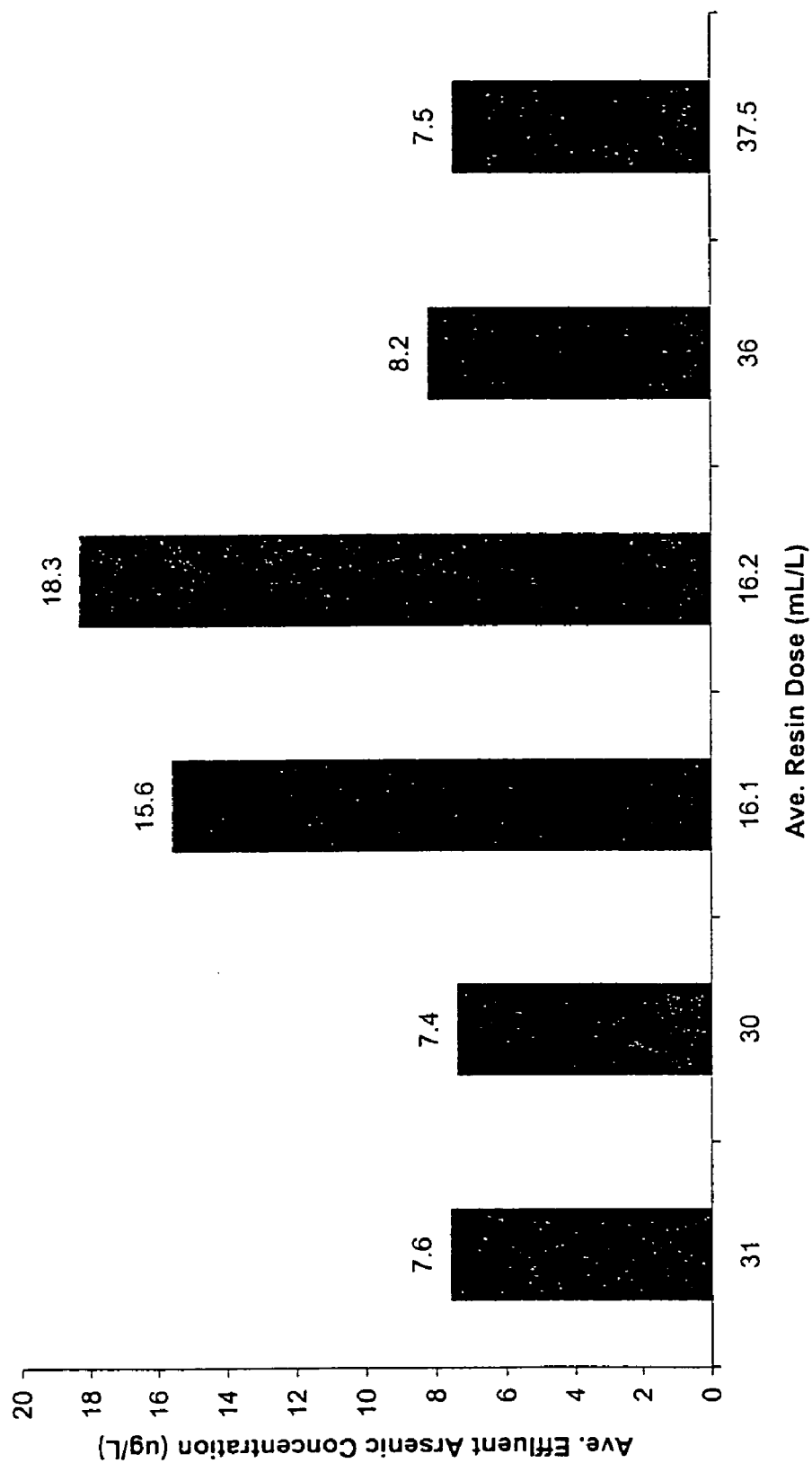
FIG. 2 is a graph showing removal rate (%) of arsenic from a ground water using MIEX® resin as a function of resin dose (mL/L) as described in Example 1.

FIG. 2 shows the relationship of average effluent arsenic to average resin dose within each distinct set of operating conditions. Increasing the resin dose led to substantial increases in arsenic removal rates.

Influent silica levels were consistently around the 100-110 mg/L level throughout the trial. Silica removal rates were very low, ranging from zero to 6.5%. Influent pH varied from 8.1 to 8.7. The processed water tended to have lower pH, ranging from 7.6 to 8.4. The magnetic resin process led to a slight increase in treated water turbidity. Total alkalinity was reduced by anywhere between 10 and 45 mg/L. This corresponds to reductions of up to 36%. There is a strong correlation between the amount of arsenic removed during a particular segment of the trial and the resin dose during that segment. Where the resin dose averaged 16.1-16.2 mL/L, removal rates were in the range 64% to 70%. At this resin dose, there was a slight impact of contact time; the longer the contact time, the greater the removal rate. At average resin doses between 30 and 37.5 mL/L, removal rates varied between 84% and 86%. In the range of data that constituted this observation, there was no discernible impact of contact times on the removal rate.

From these data, it can be seen that a key determinant of arsenic removal rate in the magnetic resin process was resin dose. Regardless of contact time, there was a 15-20% increase in the arsenic removal rate when the average resin dose was increased from about 16 mL/L to between about 30 and about 37.5 mL/L. At the higher resin doses, the magnetic resin process achieved average effluent arsenic levels of around 8 µg/L or less.

Background silica was found not to negatively impact the ability of the magnetic resin process to remove arsenic V from this water. Removal of silica itself was low, around 5%. No other treated water parameters were negatively impacted by the use of the magnetic resin process, nor did they negatively impact the effectiveness of the magnetic resin process in this application.

These results show that the magnetic resin process is effective at reducing arsenic levels in this water to around 8 µg/L or less. In this instance, the key parameter in being able to achieve this effluent arsenic level was resin dose.

Example 2

Perchlorate Removal from Surface Water

Influent water in this trial was drawn directly from a surface water source. The trial was conducted using a 10 GPM magnetic resin pilot plant similar to that shown in FIG. 1. The water contained perchlorate in quantities ranging from 2.5 to 3.6 µg/L.

Resin dose was varied between 20 and 50 mL/L. Contact time and regeneration rate were held constant for the majority of the trial at 30 minutes and 10% respectively.

The capability of the magnetic resin process to remove perchlorate from this water was demonstrated. Results showed that removal efficiencies of 50% are achievable under the operating conditions applied during this trial; and perchlorate removal efficiency increases with increasing resin dose.

There was a high level of background sulfate in the water, typically in excess of 200 mg/L.

Removal efficiencies do not stabilize until the process has been running for some time. In this pilot plant setting, the entire resin inventory must be passed through the regeneration system approximately three times before the resin itself is primed for the trial.

In this trial, the system reached steady state by the time the trial had been running for about five days. By this time, the system had undergone at least six regenerations.

During the trial, and after conditions stabilized, the magnetic resin pilot plant was operated under three sets of conditions, shown in Table 3 below. Resin dose was varied between 20 and 50 mL/L.

The 30-minute contact time was chosen in order to provide a reasonable period of time for perchlorate adsorption to occur.

Figure 4:
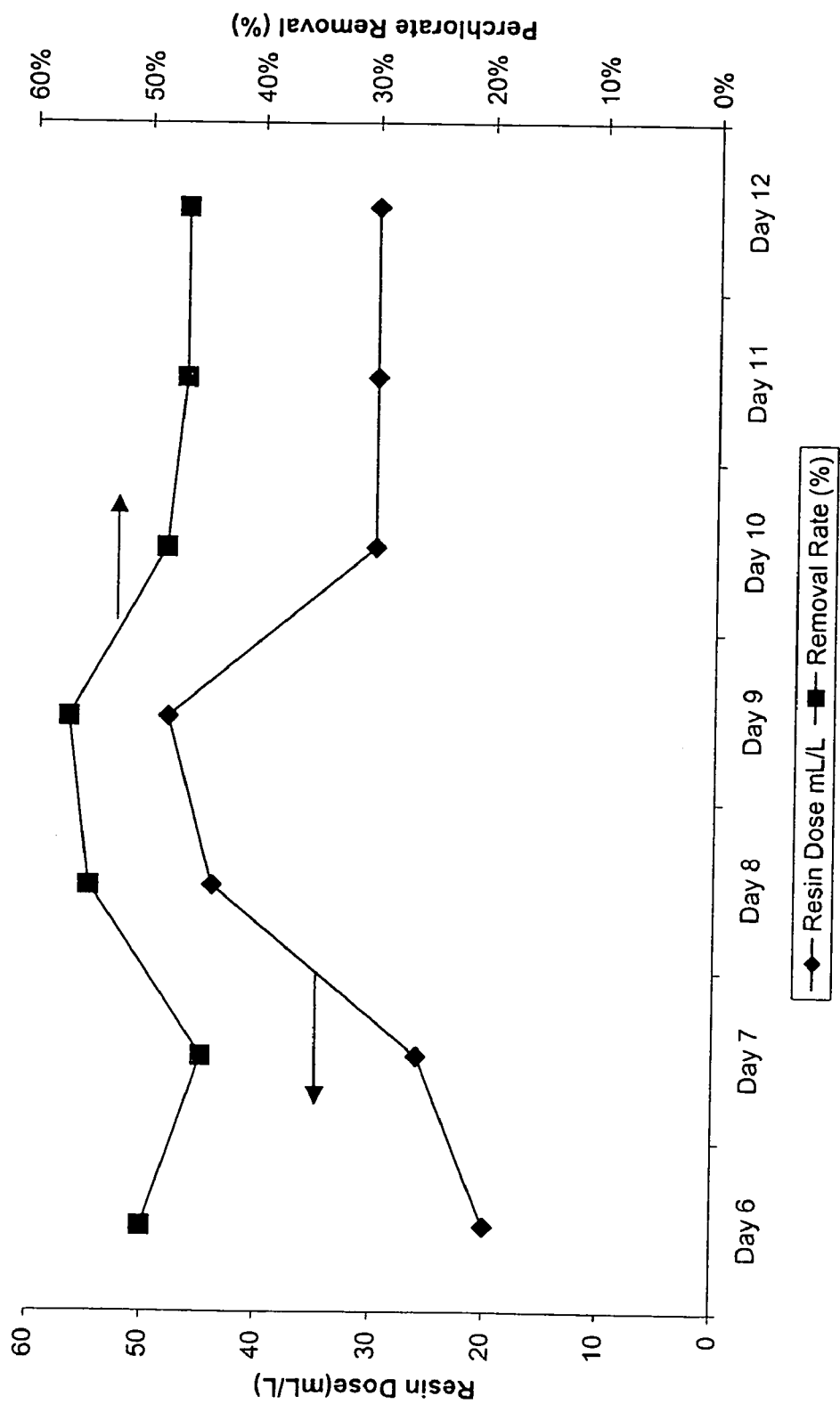
FIG. 4 is a graph showing perchlorate removal rate (%) from surface water as a function of resin dose (mL/L) as described in Example 2.

Regeneration rate was held constant at 10% (except for a short period of operation at a regeneration rate of 5% at the beginning of the period of stable operation shown in FIG. 4. This variable was not extensively tested during this trial because it is understood from trials and bench work that regeneration rate is not a critical parameter in perchlorate removal efficiency on this particular water.

TABLE 3

| Day of Trial | Contact Time (min) | Contactor Resin Concentration (mL/L) | Regeneration Rate (%) |
|---|---|---|---|
| 6–7 | 30 | 26–30 | 5–10 |
| 8–9 | 30 | 44–50 | 10 |
| 10–12 | 30 | 30 | 10 |

The results of all analyses are given in Table 4.

TABLE 4

Perchlorate and DOC Removal

| Operating Conditions | | Perchlorate | | | DOC (on-site) | | DOC (ext.) | |
|---|---|---|---|---|---|---|---|---|
| Resin Dose (mL/L) | Regen. Rate (%) | Raw (ppb) | Resin Treated (ppb) | Removal (%) | Raw (ppm) | Resin Treated (ppm) | Raw (ppm) | Resin Treated (ppm) |
| 20 | 10% | 2.8 | 1.4 | 50.0% | 2.99 | 2.61 | | |
| 26 | 5% | 2.9 | 1.6 | 44.8% | 3.08 | 2.85 | 3.09 | 2.20 |
| 44 | 10% | 3.1 | 1.4 | 54.8% | | | | |
| 48 | 10% | 3.0 | 1.3 | 56.7% | | | | |
| 30 | 10% | 2.9 | 1.5 | 48.3% | | | | |
| 30 | 10% | 3.0 | 1.6 | 46.7% | | | | |
| 30 | 10% | 3.0 | 1.6 | 46.7% | 3.00 | 2.02 | 2.90 | 1.92 |

Figure 3:
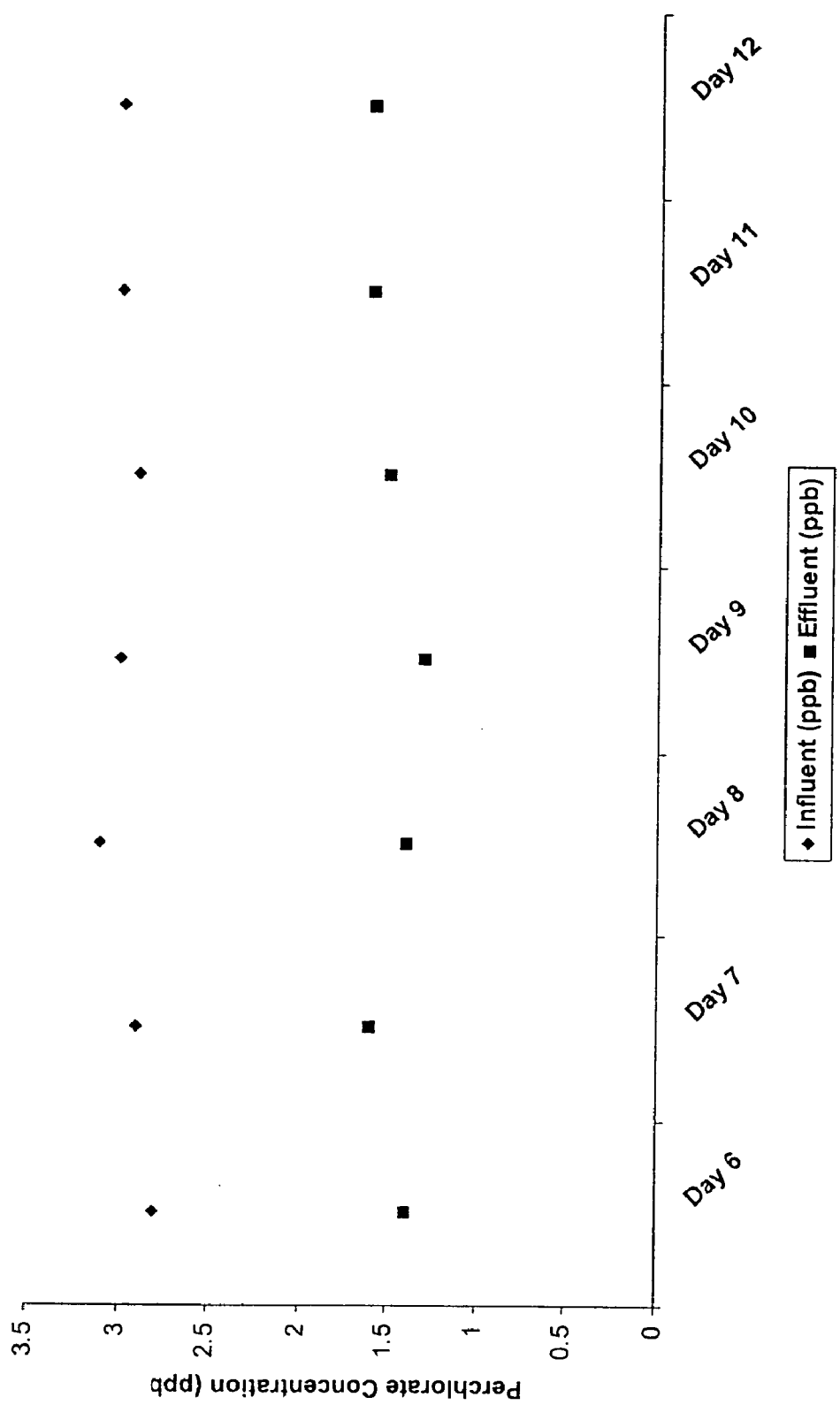
FIG. 3 is a graph showing influent (top line) and effluent (bottom line) perchlorate levels (μg/L) as described in Example 2.

Influent and effluent perchlorate levels are presented in FIG. 3. Variation in perchlorate removal efficiency with resin dose is shown in FIG. 4. The removal data in FIG. 4 was taken on days 6-12 after the process had stabilized Under steady state conditions, the effluent typically has a perchlorate concentration of around 1.5 µg/L. (See FIG. 3, day 7 onwards.)

As shown in FIG. 4, removal efficiency values under steady state were in the range 45-57%.

The influent perchlorate concentration during this trial (2.5 µg/L to 3.6 µg/L) is at least a factor of ten lower than any other trial that has been conducted to date using the magnetic resin process. This makes adsorption of the target anion a slower process, especially in the presence of high sulfate levels. Adsorption of perchlorate has been shown to be feasible, and optimal under higher contact times.

As seen in FIG. 4, there was a definite correlation between removal efficiency and resin dose. Where resin dose was around 30 mL/L, the removal efficiency was in the range 45% to 48%. Increasing the resin dose under steady state conditions to 50 mL/L yielded an increase in removal efficiency to 55% to 57%. Further increases in resin dose can provide removal efficiencies of up to at least about 70%.

Influent TOC levels were in the range 3-4 mg/L, the majority of which existed as DOC. DOC removal rates varied from 0.2 to 1.0 mg/L (up to 33%), which was to be expected in water which contained such high sulfate levels.

The impact of magnetic resin on the presence of sulfate in this water was examined in bench tests prior to the trial. These results are shown in Table 5. Treating the water with magnetic resin reduces the high levels of sulfate. Here, resin dose and regeneration rate are important factors.

TABLE 5

Sulfate - Bench Tests on Surface Water

| Water Type | Raw | Treated | Treated | Treated | Treated |
|---|---|---|---|---|---|
| Resin Dose (mL/L) | N/A | 20 | 40 | 20 | 40 |
| Contact Time (min) | N/A | 30 | 30 | 30 | 30 |
| Regeneration Rate (%) | N/A | 20 | 20 | 10 | 10 |
| Sulfate (mg/L) | 213 | 160 | 97 | 190 | 169 |

These results show that removal efficiencies of 50% are achievable in influent water streams having low perchlorate levels and high competing sulfate levels under the operating conditions applied during this trial; and perchlorate removal efficiency increases with increasing resin dose.

Example 3

Chromium (VI) Trial

The groundwater tested was from wells that typically contain less than 10 µg/L total chromium. Water for this trial was spiked with 100 µg/L chromium (VI). The magnetic resin process was trialed using a 2 GPM pilot plant over a three week period. Flow rates varied from 0.5-1 GPM. Resin doses were varied between 10 and 60 mL/L, contact times between 15 and 40 minutes, and regeneration rates between 6% and 18%.

Figure 5:
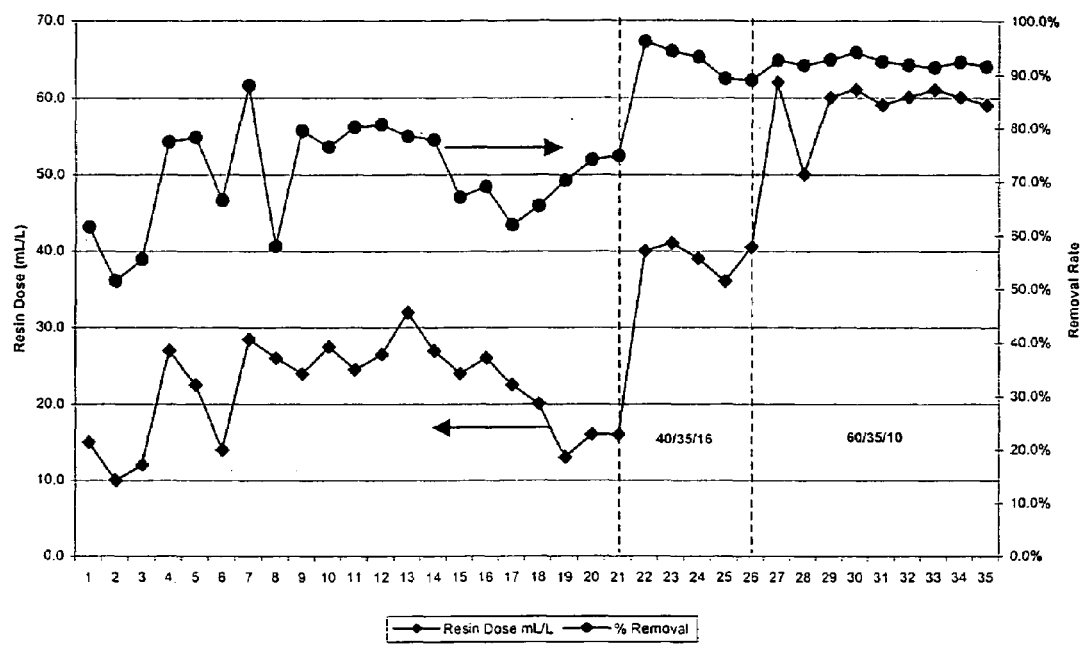
FIG. 5 is a graph showing chromium VI removal rate (%) from ground water as a function of resin dose (mL/L) as described in Example 3.
Figure 6:
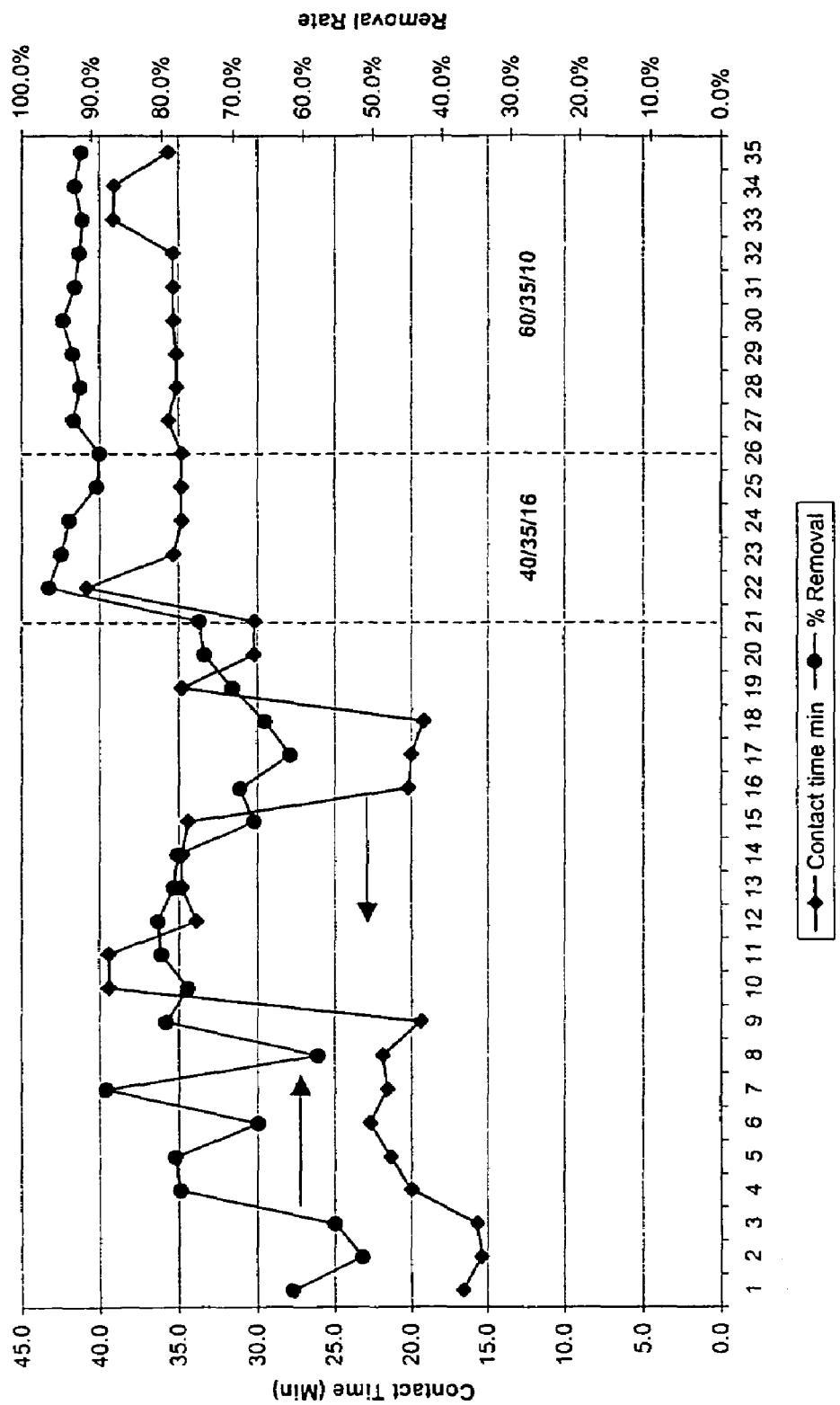
FIG. 6 is a graph showing chromium VI removal rate (%) as a function of contact time (minutes) as described in Example 3.
Figure 7:
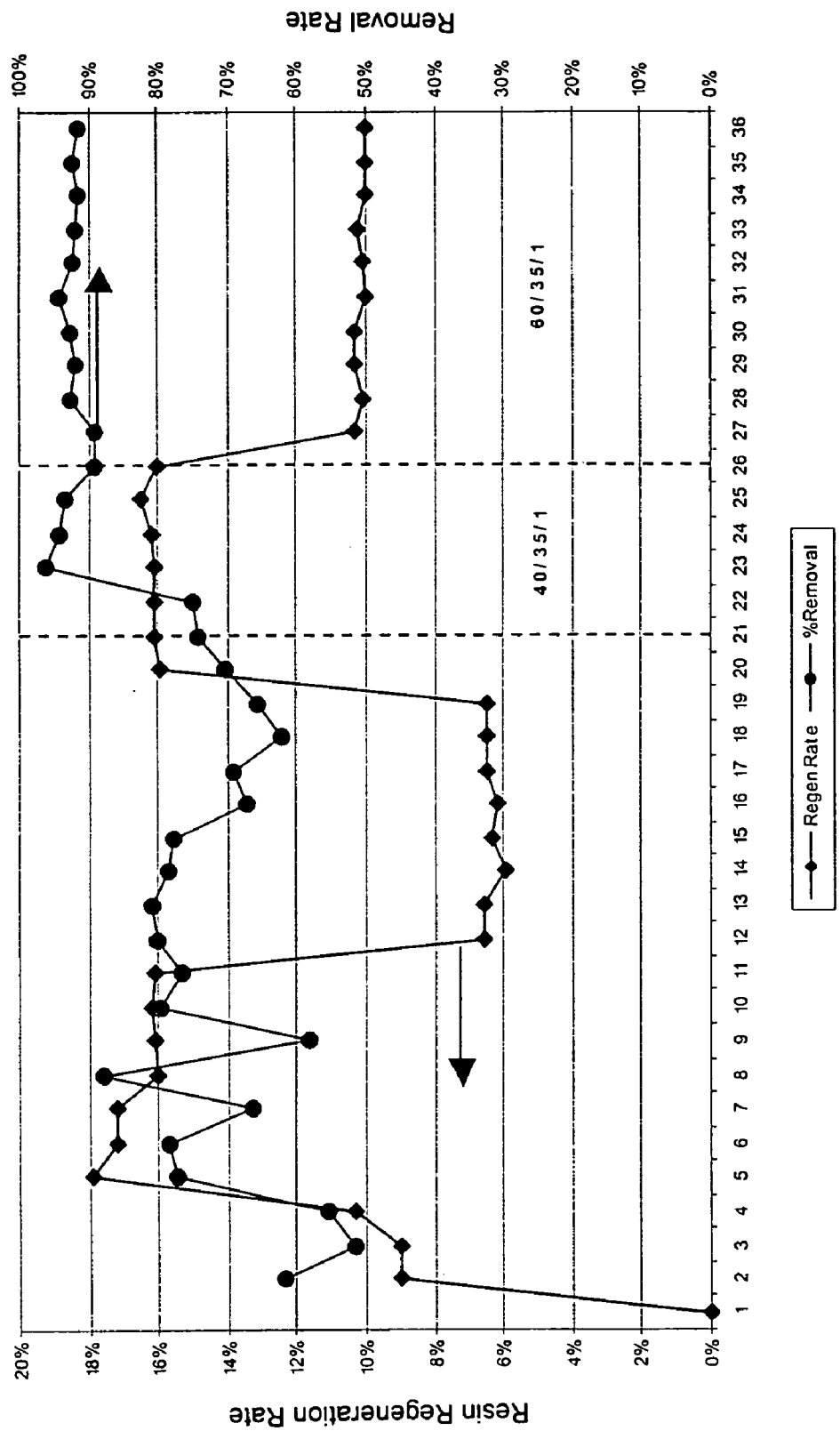
FIG. 7 is a graph showing chromium VI removal rate (%) as a function of resin regeneration rate (%) as described in Example 3.

The magnetic resin trial can be divided into three sections (see FIGS. 5 to 7). For Samples 1 through 21, the resin dose was varied between 10 and 32 mL/L, the contact time between 15 and 40 minutes and the regeneration rate between 6% and 18%. In this period, the effectiveness of the magnetic resin process was variable, removing between 50% and 88% Cr (VI). For Samples 22 through 26, constant conditions of 40 mL/L resin dose, 35 min. contact time and 16% regeneration rate were applied. In this region, removal was consistently above 88% with an average removal of 92.3%. From Sample 27 onward, constant conditions of 60 mL/L resin dose, 35 min. contact time and 10% regeneration rate were applied. In this region, removal was consistently above 91% with an average removal of 92.2%.

Important determinants of removal success were resin dose and contact time. Removal rates in excess of 90% were achieved when the resin dose was at least 40 mL/L and contact times were 30 minutes or above. The same results were achieved for two different resin doses, 40 and 60 mL/L, when the reduction in resin dose was compensated for by an equivalent increase in regeneration rate. However, regeneration rate is not a critical parameter in this example in ranges above 10%, while a resin dose of 40 mL/L represents a threshold resin dose required to achieve >90% removal.

When a Markush group or other grouping is used herein, all individual members of the group and all combinations and subcombinations possible of the group are intended to be individually included in the disclosure. It is intended that any one or more members of any Makush group or listing provided in the specification can be excluded from the invention if desired. Whenever a range is given in the specification, for example, a temperature range, a time range, or a composition range, all intermediate ranges and subranges, as well as all individual values included in the ranges given are intended to be included in the disclosure. The invention illustratively described herein suitably may be practiced in the absence of any element or elements, limitation or limitations which is not specifically disclosed herein. Every formulation or combination of components or device elements described or exemplified herein can be used to practice the invention, unless otherwise stated. One of ordinary skill in the art will appreciate that materials, methods, device elements, reagents, process conditions, separation methods, purification methods, analytical methods, methods for regenerating resin, other than those specifically exemplified can be employed in the practice of the invention without resort to undue experimentation. All art-known functional equivalents, of any such methods, device elements, and materials are intended to be included in this invention.

The invention illustratively described herein suitably may be practiced in the absence of any element or elements, limitation or limitations which is not specifically disclosed herein. The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements.

All patents and publications mentioned in the specification are indicative of the levels of skill of those skilled in the art to which the invention pertains. References cited herein are incorporated by reference herein in their entirety to indicate the state of the art as of their filing date and it is intended that this information can be employed herein, if needed, to exclude specific embodiments that are in the prior art.

All references cited herein are incorporated by reference in their entirety. In the event that there is a discrepancy in substance between subject matter in a cited reference and the disclosure herein, the disclosure herein applies.

The invention claimed is:

1. A method for removing a contaminant selected from the group consisting of inorganic ionic species and organometallic ions from water containing an unacceptably high concentration of said contaminant, said method comprising:
dispersing an ion exchange resin capable of adsorbing said inorganic ionic species or organometallic ion contaminant in the water;
separating a portion of the ion exchange resin loaded with said inorganic ionic species or organometallic ion contaminant for regeneration and adding to the water replacement ion exchange resin in amounts sufficient to remove said inorganic ionic species or organometallic ion contaminants in said water down to an acceptable concentration.

2. The method of claim 1 wherein said contaminant is an inorganic ionic species.

3. The method of claim 1 wherein said contaminant is an organometallic ion.

4. The method of claim 1 wherein said ion exchange resin is a magnetic ion exchange resin.

5. The method of claim 1 also comprising the steps:
regenerating said removed portion of ion exchange resin; and
periodically or continuously adding said regenerated resin to the water, the regenerated resin forming all or part of the replacement resin.

6. A method of claim 5 wherein the replacement resin comprises regenerated resin and virgin resin.

7. A method of claim 1 wherein the ion exchange resin is dispersed in the water in a process container.

8. A method of claim 7 wherein ion exchange resin loaded with the contaminant is transferred from the process container to a separator to allow loaded resin to be separated from the water.

9. A method of claim 8 wherein separated loaded resin is recycled back to the process container.

10. A method of claim 9 wherein said portion of the ion exchange resin loaded with the contaminant separated for regeneration is separated from the loaded resin being recycled back to the process container.

11. The method of claim 1 in which contaminated water is continuously or periodically flowed into and out of said process, and said replacement ion exchange resin is continuously or periodically added to said process in an amount sufficient to prevent exhaustion of substantially all ion exchange resin in said process.

12. The method of claim 2 in which said magnetic ion exchange resin is a strongly basic ion exchange resin, and said inorganic ionic species contaminant is selected from the group consisting of perchlorate, sulfate, nitrate, phosphate, phosphite, bromide and bromate, and species containing arsenic, chromium, and combinations of any two or more thereof.

13. The method of claim 12 wherein said magnetic ion exchange resin is MIEX® resin.

14. The method of claim 2 wherein said ion exchange resin is a weakly basic ion exchange resin and said inorganic ionic species contaminant is selected from the group consisting of hydrogen sulfide, bicarbonate, the hydrogen sulfate ion, selenate, copper, cadmium, cobalt, mercury, and combinations of any two or more thereof.

15. The method of claim 2 wherein said ion exchange resin is a strongly acidic ion exchange resin and said inorganic ionic species contaminant is selected from the group consisting of sodium, potassium, nickel (II), calcium, magnesium, manganese, iron, cobalt, and combinations of any two or more thereof.

16. The method of claim 2 wherein said ion exchange resin is a weakly acidic ion exchange resin and said inorganic ionic species contaminant is selected from the group consisting of sodium, potassium, calcium, magnesium, manganese, copper, and nickel, and combinations of any two or more thereof.

17. The method of claim 1 in which said water contains competing ions capable of being adsorbed by said ion exchange resin.

18. The method of claim 17 in which the concentration in said water of said competing ions is greater than the concentration of said inorganic contaminant ions.

19. The method of claim 18 in which said ion exchange resin has greater selectivity for said competing ions than for said inorganic ionic species contaminants.

20. The method of claim 17 in which said competing ions are selected from the group including sulfate, bicarbonate, silicate and nitrate, and combinations of any two or more thereof.

21. The method of claim 17 in which said competing ions are sulfate ions at a concentration of between about 10 mg/L and about 250 mg/L.

22. The method of claim 1 in which the ratio of raw water to be treated to ion exchange resin slurry in said process is between about 11.5:1 and about 199:1.

23. The method of claim 11 in which water is flowed into and out of said process at a rate of about one process container volume every 2 to 40 minutes.

24. The method of claim 5 wherein said regeneration is performed by contacting said resin with a regenerant solution.

25. The method of claim 24 wherein said regenerant solution is recycled to the regeneration step at least about 5 to about 25 times.

26. The method of claim 24 also comprising treating a waste stream comprising said regenerant solution used to regenerate said ion exchange resin, by removal of said inorganic ionic species contaminants.

27. The method of claim 1 also comprising filtering water flowed out of said process.

28. The method of claim 1 also comprising deaerating said water.

29. The method of claim 28 wherein said water is deaerated prior to being to being placed in said process container.

30. The method of claim 28 wherein said water is deaerated prior to removal of said ion exchange resin therefrom.

31. The method of claim 1 wherein said inorganic ionic species contaminant is arsenic V.

32. The method of claim 1 wherein said inorganic ionic species is arsenic III, and said water is pretreated to oxidise said arsenic III to arsenic V.

33. The method of claim 1 wherein said inorganic ionic species contaminant is chromium.

34. The method of claim 1 wherein said contaminant is perchlorate.

35. The method of claim 1 wherein said inorganic ionic species contaminant is nitrate.

36. The method of claim 1 wherein said contaminant is bromide.

37. The method of claim 1 wherein said inorganic ionic species contaminant is bromate.

38. The method of claim 1 wherein water removed from said process is placed in a second process and said method steps are repeated.

39. The method of claim 1 wherein said water has a total alkalinity of at least about 500 mg/L $CaCO_3$.

40. A method for removing an inorganic ionic species contaminant from water containing an unacceptably high concentration of said contaminant, said method comprising:
   dispersing an ion exchange resin capable of adsorbing said inorganic ionic species contaminant in water in a process container;
   subsequently removing said ion exchange resin from said process container;
   regenerating a portion of said removed ion exchange resin and returning it to said process container; and
   recycling at least a portion of said ion exchange resin which is unregenerated to said process;
   wherein said regenerated and unregenerated ion exchange resin is added to said process container in amounts sufficient to remove said inorganic ionic species contaminants in said water down to acceptable concentrations.

41. The method of claim 40, wherein the portion of said ion exchange resin which is regenerated and returned to the process is about 20% or less.

42. The method of claim 40, wherein the portion of said ion exchange resin which is regenerated and returned to the process is about 10% or less.

43. A method for removing an inorganic ionic species contaminant from water containing an unacceptably high concentration of said contaminant, said method comprising:
   dispersing an ion exchange resin capable of adsorbing said inorganic ionic species contaminant in water in a process container;
   removing ion exchange resin loaded with said inorganic ionic species contaminant from said process container and adding replacement ion exchange resin to said process container;
   determining the level of said inorganic ionic species contaminant remaining in said water; and
   repeating the foregoing method steps if necessary until the level of said inorganic ionic species contaminant remaining in said water has reached an acceptable level.

* * * * *